Feb. 7, 1967

J. P. DOERING, JR 3,303,453

VARIABLE RESISTANCE DEVICE

Filed Nov. 26, 1963

INVENTOR.
JOHN P. DOERING jr.

BY Ferd L. Mehlhoff

ATTORNEY

Feb. 7, 1967  J. P. DOERING, JR  3,303,453
VARIABLE RESISTANCE DEVICE
Filed Nov. 26, 1963
2 Sheets-Sheet 2

INVENTOR.
JOHN P. DOERING jr.
BY
ATTORNEY

United States Patent Office 3,303,453
Patented Feb. 7, 1967

3,303,453
VARIABLE RESISTANCE DEVICE
John P. Doering, Jr., Santa Ana, Calif., assignor to Beckman Instruments, Inc., a corporation of California
Filed Nov. 26, 1963, Ser. No. 325,862
6 Claims. (Cl. 338—162)

The present invention relates to a variable resistance device of the type commonly referred to as a precision potentiometer and, more particularly, to a variable resistance device using fixed resistors electrically connected thereto. The term potentiometer as used hereinafter will be understood as pertaining to variable resistance devices in general.

Precision poteniometers and variable resistance devices commonly use a coiled resistance wire which is traversed by a movable wiper to vary the electrical output of the device. It is common practice to use fixed resistors connected in shunt across portions of the variable resistance coil to achieve nonlinear functions or to use fixed resistors connected in series with the coil to provide a predetermined voltage at either or both ends of the coil.

For various reasons, it is not normally practical to attach the fixed resistors during manufacture or assembly of the precision potentiometer. For one thing, precision potentiometers are usually manufactured to predetermined resistances and linearities and particular customer functions that require fixed resistors are not usually known beforehand. Furthermore, it is sometimes not possible to know prior to assembly of the resistance coil and its associated wiper the exact position on the coil where the fixed resistor should be connected. Also, in order to provide precise electrical functions, it is first necessary to know the electrical characteristics of the potentiometer prior to determining the requisite value of fixed resistance to be added in series or in shunt relationship with the variable resistance coil.

In the past, it has been the practice to first assemble the potentiometer and then, after determining the precise electrical output at critical points, a fixed resistance of the proper value is selected. The resistor itself is then electrically connected and physically attached onto the outside of the potentiometer housing by screws or other suitable attaching means.

Users of potentiometers usually object to mounting of fixed resistors externally because they take up extra room and make wiring more difficult. The resistors can be more easily damaged when in this exposed position. Thus, some customers require that the resistors be mounted internally of the casing in order to avoid the above disadvantages. In order to mount the resistors internally, it has been necessary in the past to disassemble portions of the potentiometer, attach the resistor internally and connect the leads internally on suitable taps or terminal connectors to the coil and then reassemble the potentiometer. This has several disadvantages in that the potentiometer can rarely be assembled exactly the same as it was when the original electrical measurements were made so that, after the device is reassembled, it may no longer be within the proper conformity limits. Flux and solder sometimes spatters onto the potentiometer parts during connection of the resistor leads to the proper terminal or tap connectors. After the internal wiring is completed, it is difficult to clean the potentiometer because the leads are in the way and because the leads might become damaged.

Therefore, it is an object of the present invention to provide a new and improved potentiometer using fixed resistors connected to the variable resistance member and mounted within the potentiometer housing without necessitating disassembly of the potentiometer components.

A further object of the present invention is to provide a new and improved mounting arrangement for fixed resistors connected to the variable resistance element of a potentiometer which arrangement facilitates mounting of the fixed resistances after assembly of the potentiometer components yet, does not increase the outside dimensions of the potentiometer assembly.

Another object of the present invention is to provide a method of assembling the components of a potentiometer and the subsequent connection of suitable fixed resistance thereto which method does not require disassembly of the potentiometer components in order to internally mount the fixed resistors.

Further objects and advantages will become apparent as the following description proceeds and the features of novelty which characterize the invention will be pointed out with particularity in the claims annexed to and forming a part of this specification.

In carrying out the objects of the present invention there is provided a variable resistance device or potentiometer having an external housing adapted to receive a resistance coil and a movable wiper assembly therein and including terminal or tap connectors electrically connected to the resistance coil. In order to mount a fixed resistor after assembly of the potentiometer components, the housing is provided with an aperture adapted to receive a resistor having suitable shape for insertion through the aperture and having leads extending from one end thereof. The resistor leads extend from one side thereof and means are provided on the resistor for supporting it within the aperture formed in the housing. The resistor leads extend outwardly adjacent the outside of the housing and are connected externally between a pair of said terminal or tap connectors mounted on said housing.

For a better understanding of the invention, reference may be had to the accompanying drawings in which.

Figure 1:
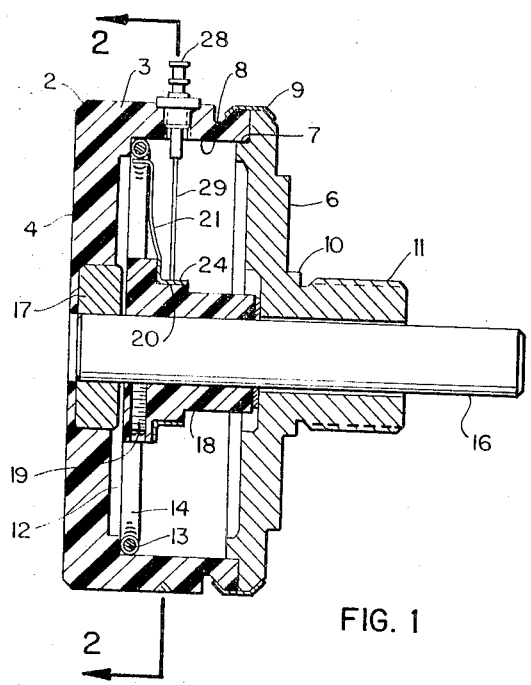
FIG. 1 is a cross-sectional view of a precision potentiometer of the type to which the present invention is applicable.
Figure 2:
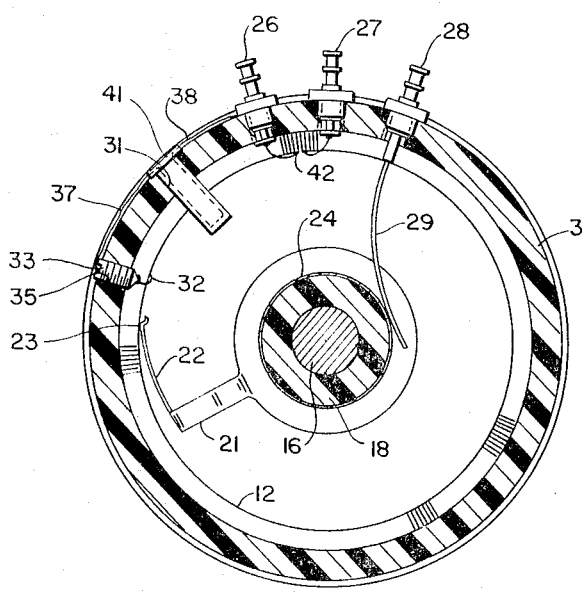
FIG. 2 is a cross-sectional view taken along line 2—2 of FIG. 1 and illustrating the present invention.

Illustrative of the type of apparatus to which the present invention is applicable is the potentiometer shown in FIGS. 1 and 2. The potentiometer includes a housing 2 which is preferably molded in a unitary piece of nonconductive material. The housing comprises a cylindrical shell portion 3 and a back plate 4. A front lid 6, having a shoulder 7 which registers with the internal surface 8 of the cylindrical shell portion 3, is fixed to the housing band clamp 9. The front lid 6 includes a shoulder 10 and a threaded boss 11 for mounting the potentiometer in an instrument panel or the like.

A resistance element 12, which may comprise a circular core 13 having a plurality of turns of resistance wire 14 wound thereon, is positioned within the housing 2. A shaft 16 is rotatably mounted through the front lid 6 and supported by a bearing 17, which is mounted in the back plate 4 of the housing 2. Fixedly mounted on the shaft 16 is a block 18, which is preferably made of a nonconducting material similar to that of the outer housing 2. In the illustrated embodiment of the invention, the block 18 is retained on the shaft 16 by set screw 19 threaded into the block 18 and bearing against the shaft.

The block 18 has a cylindrical surface 20, the axis of which is colinear with the axis of rotation of the shaft 16. Mounted for rotation with the shaft 16 and the block 18 is a wiper or contact assembly including a circular bushing 24 and a carrier arm 21 that extends outwardly adjacent the inner periphery of the resistance coil 12. Attached to the outer end of the contact carrier arm 21 is a spring element 22 (best seen in FIG. 2) having an end bent to form a wiper or contact 23 which is urged into engagement with the inside diameter of the resistance element 12 by the action of the spring 22. The contact carrier arm 21 extends from the circular bushing 24 that is mounted on the coaxial surface 20 of the block 18. The bushing 24 is fixed to the block 18 by any suitable means, such as being a press fit thereon.

Terminal connectors 26, 27 and 28 are mounted in the cylindrical shell portion 3 of the housing 2, the terminals providing for electrical connection to the opposite ends of the resistance wire 14 and to the wiper or contact 23. As will be seen in FIG. 2, a circuit is completed from the terminal 28 to the contact 23 through a brush 29, mounted in the terminal 28 and riding on the bushing 24, the brush 29, bushing 24 contact carrier arm 21 and spring element 22 being formed of electrically conducting material.

As thus far described, the potentiometer and its resistance element and electrical contact or wiper mechanism form no part of the present invention but are intended only to be illustrative of the type of variable resistance apparatus to which the present invention is best adapted. As will now be explained, the invention deals with the assembly and internal mounting of fixed resistors for achieving various electrical output functions without requiring disassembly of the potentiometer.

Referring now to FIG. 2, there is shown an arrangement for mounting resistors within the casing of the potentiometer after the apparatus has been completely assembled. It should be noted that the location of the fixed resistor depends upon the particular function desired. In the embodiment shown in FIG. 2, the resistor is mounted in shunt across an end section of the resistance element 12 between the end terminal 26 and a point on the resistance element such as the point 32.

In order to precisely locate the exact position where the shunt resistance is to be connected, a voltage is applied across the resistance element 12 and the wiper or contact 23 is rotated as voltage output readings are taken across one of the terminals 26 or 27 and the terminal 28. When the exact position is located, an electrical tap is made onto the resistance wire 14 at that point.

Tapping of the resistance wire 14 may be accomplished by the means of the welding process and apparatus set forth in the teachings of the Patents Nos. 2,710,328 Semple, and 2,783,361 Semple, assigned to the same assignee as the present invention.

Tapping of the resistance wire 14 is made through a suitable opening 35 drilled through the cylindrical portion of the housing and the tap wire 32a is connected by soldering or welding to a tap connector 33 in the form of a screw which is then threaded into the opening 35 in the cylindrical portion 3 of the housing. While it is a simple matter to drill the tap opening 35 after assembly of the potentiometer, in actual practice, the tap opening is usually formed beforehand in the region of the prospective tap connection. Because it is possible to tap weld through the hole 35 for a distance of approximately 7° or 8°, the approximate location of the tap opening 35 for making the precise tap connection can usually be determined beforehand.

Figure 3:
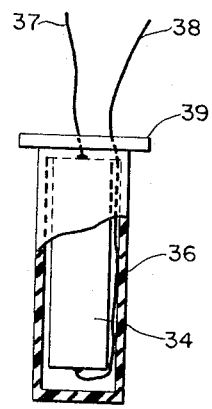
FIG. 3 is an enlarged partial cross-sectional view illustrating a resistor support casing of one embodiment of the invention.
Figure 6:
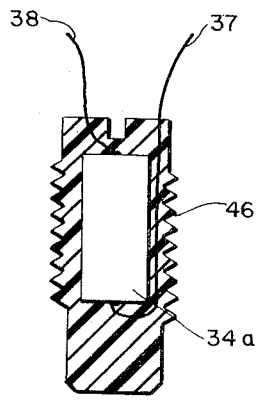
FIG. 6 is an enlarged partial cross-sectional view illustrating another embodiment of the resistor and its associated retaining means.

After the electrical characteristics of the potentiometer are checked out, the proper fixed resistance may be calculated to provide the desired electrical function for the portion of the wiper travel between the tap 32 and the end of the resistance element or terminal 26. Accordingly, a suitable resistor 34, such as shown in FIGS. 3 and 6, is selected or manufactured to provide the requisite electrical function. Means are provided on or associated with the resistor for attaching the resistor within an aperture formed through a side wall of housing. In the embodiment shown in FIG. 3, the resistor 34 includes an associated resistor support casing 36 which facilitates mounting of the resistor within the potentiometer. As may be seen in FIG. 3, the resistor support casing comprises a cylindrical elongated body 36 having a cavity therein designed to receive the resistor 34. The leads 37 and 38 of the resistor extend through an opening in the top of the support casing 36. The upper end, or end of the casing through which the leads extend, is provided with a flange or lip 39 designed to support the casing within the cylindrical portion 3 of the potentiometer housing.

In order to mount the resistor of FIG. 3, a countersunk hole or aperture 31 is formed (as shown in FIG. 2) through the cylindrical portion 3 of the housing between the tap connector 33 and the terminal connector 26. The aperture 31 is of sufficient size to receive the lower or elongated end of the resistor support casing with the shoulder 41 of the hole, formed by the countersunk portion thereof, supporting the flange 39. The upper or flanged end of the support casing is, in the embodiment of FIG. 2, substantially flush with the outer surface of the housing 2. Leads 37 and 38 of the resistor are then extended adjacent the outer surface of the housing and attached in any suitable manner, such as by soldering or welding, to the proper tap or terminal connectors so that it is shunted across the resistance element. In the embodiment of the invention, shown in FIG. 2, lead 37 is electrically connected to the tap connector 33 and lead 38 is connected to the end terminal connector 26. Thus, the portion of the resistance element 34 between the tap 32 and the tap 42, to which the end terminal 26 is connected, is electrically shunted by the resistance element.

Figure 7:
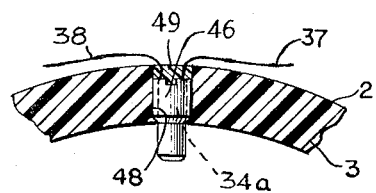
FIG. 7 is a partial plan view illustrating the resistor embodiment of FIG. 6 mounted in a housing side wall.

Another embodiment of the invention is illustrated in FIGS. 6 and 7. In this embodiment, the resistor 34a is molded or otherwise encapsulated in a body 46 of insulation material, such as an epoxy resin or the like. The molded or encapsulating body 46 is provided with threads and the upper end of the body is notched for the insertion of a screw driver. The resistor leads 37 and 38 are folded to extend out the upper or notched end of the encapsulated body of the resistor. As will be seen in FIG. 7, the aperture 48 in the cylindrical portion 3 of the housing 2, is threaded to receive the molded or encapsulated body of the resistor 34a and the resistor is retained in place within the side wall of the housing by the frictional force of these threads. The leads 37 and 38 are again extended adjacent the outside of the housing and suitably connected to proper taps or terminals.

It should be noted that the means on the resistor for securing or retaining the resistor in the side wall of the housing may comprise any number of arrangements. One such arrangement is to cement the resistor body within the aperture. In another arrangement the encapsulated resistor is provided with a flange or lip similar to that of the support casing 36. Still another arrangement is to make the relative sizes of the encapsulating body, such as body 46, and the inner diameter of the aperture of the housing so close that a press fit is necessary to insert the body within the side wall of the housing.

While the hole or aperture 31 and its countersunk or threaded portion, thereof, may be formed after assembly of the potentiometer, it has been found expedient to form this aperture prior to assembly of the resistance element and wiper mechanism. This may be easily accomplished inasmuch as the particular location of the hole is not critical as long as it is positioned in the region between the taps or terminal connectors to which the resistor is to be connected. In some instances, it is found expedient to form resistance holes or apertures 31 and tap openings 35 at spaced intervals around the circumference of the potentiometer housing for the purpose of later adding tap and resistor members. Those holes or openings not actually utilized are later filled with a plug or a plastic filler such as an epoxy resin or the like.

After the resistor element 34 is placed into the resistor support casing 36, it is the usual practice to fill the opening of the casing 36 with a suitable insulating material 49 (best seen in FIG. 7), such as an epoxy resin, for retaining the resistor within the housing and for sealing the opening flush with the outside surface of the housing. The same type of filler and sealing material may be inserted around the tap connector 33 for enclosing the upper portion of the threaded opening 35 through which the tap connector is inserted.

Figure 4:
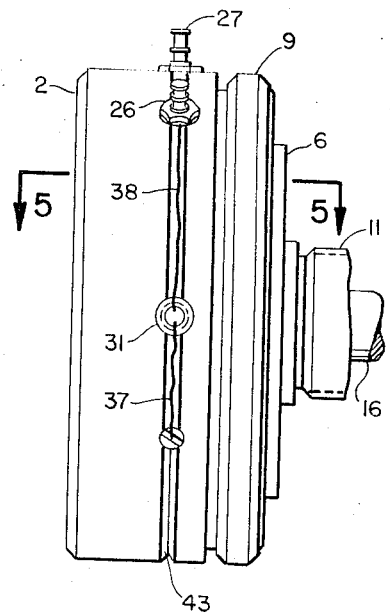
FIG. 4 is a partial plan view of a refined embodiment of the invention.
Figure 5:
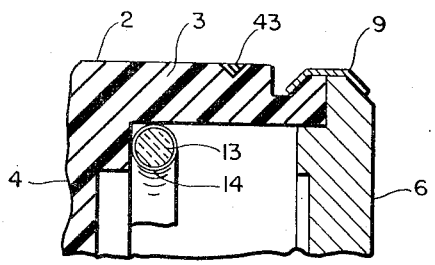
FIG. 5 is a partial cross-sectional view taken along line 5—5 of FIG. 4.

It may be desirable to enclose the leads 37 and 38 of the resistor so that they are not exposed on the outer surface of the housing. In FIG. 4 there is shown an embodiment of the invention wherein a groove 43 is provided around the outer surface of the housing and connecting with the respective openings or holes 31 and 35. After the support casing 36 and its associated resistor are in place, the leads 37 and 38 are extended along the groove 43 to the tap or terminal connectors. After making electrical connection of the leads 37 and 38, the groove 43 may be filled with an epoxy or other type of insulation material, as shown in FIG. 5, and allowed to harden into place. Thus, in the embodiment of the invention shown in FIGS. 4 and 5 the leads, as well as the resistor element 34, are completely enclosed and sealed within the outer housing of the potentiometer.

While the resistor mounting arrangement is described and illustrated in connection with a single-turn potentiometer, it will be obvious that the same approach could be applied using a multi-turn potentiometer coil in which the resistance element is in the form of a helically wound core forming a multitude of turns located within the cylindrical portion of the housing member. It should also be pointed out that, while the resistor is connected between a tap and a terminal connector in the illustrated embodiment, it can also be connected between a pair of tap connectors in shunt across a small portion of the variable resistance, or connected between the end terminals 26 and 27 in shunt across the entire resistance element. Thus, as used hereinafter in the claims, the terms "connectors" or "connector members" are meant to include both end terminal members and tap connectors.

While in accordance with the patent statutes there has been described what at present is considered to be the preferred embodiment of the present invention, it will be obvious to those skilled in the art that various changes and modifications may be made therein without departing from the invention and it is, therefore, the aim of the appended claims to cover all such changes and modifications as fall within the true spirit and scope of the invention.

What is claimed is:

1. In a variable resistance device, the combination comprising:
   a housing having side walls defining a recess, a variable resistance element and its associated electrical wiper mechanism mounted in said recess;
   end terminal connectors and tap connectors mounted on said housing and electrically connected to said variable resistance element in said housing;
   a fixed resistor having a pair of leads adapted to be electrically connected between a pair of said terminal and tap connectors mounted on said housing;
   a resistor support casing having a cavity adapted to receive said resistor therein with said resistor leads extending through an opening in one end of said support casing, said support casing having a flange on said one end thereof; and
   said housing having an aperture extending through a side wall thereof and adapted to receive said support casing, said aperture being countersunk from its outer surface inwardly substantially transverse to the wall of said housing to form a shoulder against which said flange of said support casing abuts to be retained in said aperture so that said leads of said resistor may be extended adjacent the outer surface of said housing and attached to a pair of said terminal and tap connectors.

2. In a variable resistance device, the combination comprising:
   a cylindrical-shaped housing enclosing a variable resistance element and its associated electrical wiper mechanism; terminal and tap connectors mounted on said housing and electrically connected to the variable resistance element;
   a fixed resistor having a pair of leads adapted to be electrically connected between a pair of said terminal and tap connectors mounted on said housing;
   a cylindrical resistor support casing having a cavity adapted to receive said resistor therein with said resistor leads extending through an opening in one end of said casing, said casing having an outwardly extending lip around said end thereof through which said leads extend; and
   said housing having an aperture extending through the cylindrical outer wall thereof and communicating with said recess in said housing, said aperture being of a size slightly greater but conforming to the shape of said support casing and adapted to receive said support casing, said aperture being countersunk from its outer surface inwardly to form a shoulder against which said lip of said support casing abuts to retain said casing in said aperture with said leads of said resistor extended adjacent the outer surface of said housing and electrically connected to a pair of said terminal and tap connectors.

3. In a variable resistance device, the combination comprising:
   a housing having a recess therein, a variable resistance element and its associated electrical wiper mechanism mounted in said recess;
   end terminal connectors and tap connectors mounted on said housing and electrically connected to said variable resistance element;
   a fixed resistor having a pair of leads adapted to be electrically connected between a pair of said terminal and tap connectors mounted on said housing;
   a resistor support casing having a cavity adapted to receive said resistor therein with said resistor leads extending through an opening in one end of said casing, said support casing having an outwardly extending lip around said one end thereof through which said leads extend;
   an insulation filler material disposed in said casing cavity above said resistor to seal said resistor into said casing; and
   said housing having an aperture extending through a side wall thereof and communicating with said recess of said housing, said aperture being of a size adapted to receive said support casing, said aperture being countersunk from its outer surface inwardly to form a shoulder against which said lip of said support casing abuts to retain said casing and resistor aperture with said leads of said resistor extending adjacent the outer surface of said housing and electrically connected to a pair of said terminal and tap connectors.

4. In a variable resistance device, the combination comprising:
   a housing of nonconductive material having side walls enclosing a recess, a variable resistance element and its associated electrical wiper mechanism mounted in said recess;

end terminal and tap connectors mounted on said housing and electrically connected to said variable resistance element;

a fixed resistor having a pair of leads adapted to be electrically connected between a pair of said terminal and tap connectors mounted on said housing;

an elongated resistor support casing having a cavity adapted to receive said resistor therein with said resistor leads extending through an opening in one end of said casing, said support casing having an outwardly extending lip around said one end thereof through which said leads extend;

said housing having an aperture extending substantially transversely through a side wall thereof, said aperture being of a size adapted to receive said resistor support casing therethrough, said aperture being countersunk from its outer surface inwardly to form a shoulder against which said lip of said casing abuts to retain said casing in said aperture; and grooves formed in said outer surface of the housing between said aperture and said terminal and tap connectors for retaining said leads extending from said support casing and connected respectively to said pair of tap and terminal connectors.

5. In a variable resistance device, the combination comprising:

a housing of nonconductive material having side walls enclosing a recess a variable resistance element and its associated electrical wiper mechanism mounted in said recess;

end terminal and tap connectors mounted on said housing and electrically connected to said variable resistance element;

a fixed resistor having a pair of leads adapted to be electrically connected between a pair of said terminals and tap connectors mounted on said housing;

an elongated resistor support casing having a cavity adapted to receive said resistor therein with said resistor leads extending through an opening in one end of said casing, said support casing having an outwardly extending lip around said one end thereof through which said leads extend;

said housing having an aperture extending through a side wall thereof, said aperture being of a size adapted to receive said resistor support casing therethrough, said aperture being countersunk from its outer surface inwardly to form a shoulder against which said lip of said casing abuts to retain said casing in said aperture;

grooves formed in said outer surface of the housing between said aperture and said terminal and tap connectors for retaining said leads extending from said support casing and connected respectively to said pair of tap and terminal connectors; and an insulation filler material disposed in said grooves and flush with the surface of said housing for retaining said resistor leads in place within said grooves.

6. In a variable resistance device, the combination comprising:

a housing having side walls enclosing a recess, a variable resistance element and its associated electrical wiper mechanism mounted in said recess;

electrical connector members mounted on said housing and electrically connected to said variable resistance element;

an elongated fixed resistor, said resistor being disposed in a body of insulation material with the leads of said resistor extending from one end of said body and adapted to be electrically connected between a pair of said electrical connector members, said resistor body having threads formed on the outer surface thereof; and said housing having an aperture extending through a side wall thereof and having internal threads formed thereon adapted to receive said threads on said resistor body thereby to support said resistor in said aperture with said leads extending outwardly adjacent the outer surface of said housing and the remaining portion of said resistor extending inwardly toward said recess of said housing.

References Cited by the Examiner

UNITED STATES PATENTS

| | | | |
|---|---|---|---|
| 2,141,907 | 12/1938 | Hathorn | 338—184 X |
| 2,799,756 | 7/1957 | Graham | 338—121 |
| 2,830,161 | 4/1958 | Wilentchik | 338—199 X |

FOREIGN PATENTS

| | | |
|---|---|---|
| 837,633 | 6/1960 | Great Britain. |

ANTHONY BARTIS, *Primary Examiner.*